US009818294B2

United States Patent
Jiang

(10) Patent No.: US 9,818,294 B2
(45) Date of Patent: Nov. 14, 2017

(54) SYSTEM FOR INDICATING VEHICLE PRESENCE AND METHOD THEREOF

(71) Applicant: HONDA MOTOR CO., LTD., Minato-ku, Tokyo (JP)

(72) Inventor: James Jiang, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/989,272

(22) Filed: Jan. 6, 2016

(65) Prior Publication Data
US 2017/0193823 A1    Jul. 6, 2017

(51) Int. Cl.
*G08G 1/123*    (2006.01)
*G08C 23/02*    (2006.01)
*G06F 3/01*    (2006.01)
*G08B 6/00*    (2006.01)

(52) U.S. Cl.
CPC ............ *G08C 23/02* (2013.01); *G06F 3/017* (2013.01); *G08B 6/00* (2013.01)

(58) Field of Classification Search
CPC . B60C 23/00; B60C 23/0408; B60C 23/0401; B60C 23/0406; B60Q 1/2661; B60Q 1/2665; B60Q 1/06; B60Q 1/22; B60Q 1/503; B60Q 1/54; B60Q 3/023; B60R 1/02; B60R 1/12; B60R 1/1207; B60R 11/0235
USPC ..... 340/989, 944, 407.1, 5.2, 980, 991–994, 340/995.16, 995.17, 426.22, 463
See application file for complete search history.

(56) References Cited

U.S. PATENT DOCUMENTS

| | | | | |
|---|---|---|---|---|
| 6,386,007 | B1 * | 5/2002 | Johnson ................... | G01S 3/38 70/257 |
| 6,809,630 | B1 * | 10/2004 | Dreimann ............... | E05B 85/10 340/5.62 |
| 6,909,964 | B2 | 6/2005 | Armstrong et al. | |
| 8,054,203 | B2 * | 11/2011 | Breed ..................... | B60C 11/24 340/425.5 |
| 8,253,589 | B2 | 8/2012 | Grimm et al. | |
| 8,547,253 | B2 | 10/2013 | Proefke et al. | |
| 9,104,285 | B2 | 8/2015 | Colgate et al. | |
| 2009/0243791 | A1 * | 10/2009 | Partin .................... | G08C 17/00 340/5.2 |
| 2010/0158287 | A1 * | 6/2010 | Xu ......................... | H04R 1/028 381/300 |
| 2014/0031694 | A1 * | 1/2014 | Solek ................... | A61B 8/4494 600/459 |

(Continued)

FOREIGN PATENT DOCUMENTS

JP    2003-029898 A    1/2003
JP    2012-048378 A    3/2012
(Continued)

OTHER PUBLICATIONS

"Haptics 2016-2026: Technologies, Markets and Players", Sep. 1, 2015, IDTechEx Ltd, <URL: http://www.marketresearch.com/IDTechEx-Ltd-v3153/Haptics-Technologies-Players-9292686>.

*Primary Examiner* — Daniel Previl
(74) *Attorney, Agent, or Firm* — Arent Fox LLP

(57) ABSTRACT

A vehicle can detect a presence of a remote device. The vehicle can activate a sound source array that generates at least one ultrasound wave providing haptic feedback indicative of the presence of the vehicle to an operator of the vehicle, based on detecting the presence of the remote device.

20 Claims, 5 Drawing Sheets

(56) References Cited

U.S. PATENT DOCUMENTS

| | | | | |
|---|---|---|---|---|
| 2014/0333425 A1* | 11/2014 | Giraud | ............... | H04W 84/005 340/438 |
| 2015/0109148 A1* | 4/2015 | Cheatham, III | ....... | G08G 1/005 340/944 |
| 2015/0192995 A1* | 7/2015 | Subramanian | .......... | G06F 3/016 340/407.1 |
| 2015/0286952 A1* | 10/2015 | El Dokor | ............. | G06N 99/005 701/1 |

FOREIGN PATENT DOCUMENTS

| | | |
|---|---|---|
| JP | 2015-035657 A | 2/2015 |
| JP | 2015-079289 A | 4/2015 |
| KR | 10-2015-0063834 A | 6/2015 |
| WO | WO 2014/181084 A1 | 11/2014 |
| WO | WO 2015/154046 A1 | 10/2015 |

* cited by examiner

SYSTEM FOR INDICATING VEHICLE PRESENCE AND METHOD THEREOF

BACKGROUND

Vehicles are often equipped with systems to detect remote commands for initiating actions/sending commands to the vehicle, such as remote keyless entry and remote ignition, among other actions/commands, via buttons pressed on a key fob. Some vehicles can receive commands via interaction with the vehicle by an operator (e.g., buttons pressed on the vehicle, such as an ignition button, a button positioned on the door to unlock the door, etc.) based on detecting presence of the key fob. For example, the vehicle can detect a presence of the key fob via an electronic communication technology, such as radio frequency identification (RFID). In this case of RFID, the vehicle periodically polls for nearby devices, and the key fob transmits a detection signal that can be received by the vehicle (and/or vice versa).

Recently, vehicles are being equipped to detect certain gestures/motions by operators of the vehicle to initiate commands on the vehicle, which can also occur based on additionally detecting the presence of the key fob. For example, an operator of a vehicle with an associated key fob detected within a range of the vehicle can make a motion with a leg or foot near a motion detector under the vehicle tailgate to activate opening of the tailgate.

In such contexts, the operator of the vehicle may not know when remote commands and/or gestures/motions indicating commands to the vehicle can be initiated. In other words, the operator may not be aware of when the vehicle is within an acceptable range to detect remote commands or gestures from the operator.

SUMMARY

The following presents a simplified summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method of indicating vehicle presence is provided. The method includes detecting, by a vehicle, a presence of a remote device, and activating, by the vehicle, a sound source array that generates at least one ultrasound wave providing haptic feedback based on detecting the presence of the remote device.

In another example, a vehicle is provided that includes an electronic control unit for communicating with at least one system, a communications device detecting a presence of a remote device, a sound source array generating at least one ultrasound wave providing haptic feedback, and at least one processor activating the sound source array when the communications device detects the presence of the remote device.

In a further example, a non-transitory computer-readable medium storing computer executable code for indicating vehicle presence is provided. The code includes code for detecting a presence of a remote device, and code for activating a sound source array for generating at least one ultrasound wave to provide haptic feedback based on detecting the presence of the remote device.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalent.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
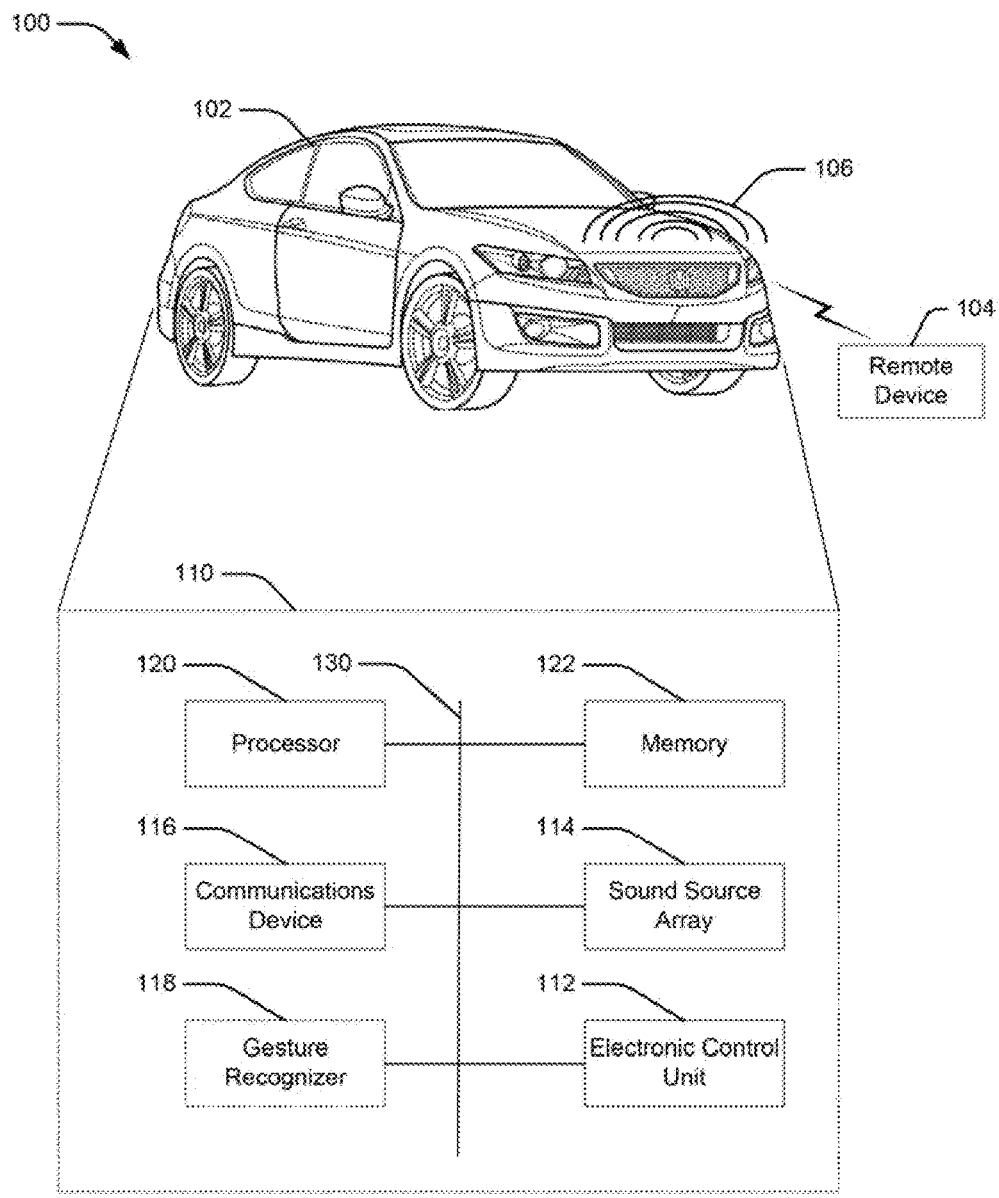
FIG. 1 illustrates a schematic view of an example operating environment of a vehicle presence indicating system according to one aspect of the disclosure.

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "location," as used herein, can refer to a position of an object in space. A location can be indicated using a coordinate system. For example, a location can be represented as a longitude and latitude. In another aspect, a location can include a height. Moreover, in an example, the location can be related to an object, such as a device detecting location of another device, and the location can be indicated based on the device detecting the location.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "remote device," as used herein, can refer to a device that is remote in location to a vehicle where the vehicle can identify and/or detect presence of the remote device by communicating therewith. For example, a remote device can include a key fob, cellular phone, tablet, or other device that can be carried outside of the vehicle and can communicate with the vehicle via one or more electronic communication technologies, such as radio frequency identification (RFID), near field communications (NFC), Bluetooth®, ZigBee®, etc.

The term "sound source array," as used herein, can refer to a collection of sound wave emitting elements (e.g., ultrasound emitters) that transmit sound waves, which can include ultrasound waves, for generating a sound field that can cause a tactile sensation. For example, the collection of sound wave emitting elements can generate an omni-directional sound field. In some examples, the sound source array can include a feedback sensor and/or processor to detect movement within the sound field.

The term "vehicle," as used herein, can refer to any moving vehicle that is capable of carrying one or more human occupants and is powered by any form of energy. The term "vehicle" can include, but is not limited to: cars, trucks, vans, minivans, SUVs, motorcycles, scooters, boats, personal watercraft, and aircraft. In some cases, a motor vehicle includes one or more engines.

The term "vehicle operator," as used herein, can refer to an entity (e.g., a person or other being, robot or other mobile unit, etc.) that can operate a vehicle. The vehicle operator can carry a remote device or other mechanism for activating one or more vehicle systems or other components of the vehicle.

The term "vehicle system," as used herein, can refer to an electronically controlled system on a vehicle operable to perform certain actions on components of the vehicle, which can provide an interface to allow operation by another system or graphical user interaction. The vehicle systems can include, but are not limited to, vehicle ignition systems, vehicle heating, ventilating, and air conditioning (HVAC) systems, vehicle audio systems, vehicle security systems, vehicle video systems, vehicle infotainment systems, vehicle telephone systems, and the like.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

FIG. 1 shows a schematic view of an example operating environment 100 of a vehicle presence indicating system 110 and example methods according to aspects described herein. For example, operating environment 100 can include a vehicle 102 within which the vehicle presence indicating system 110 can reside, and a remote device 104 that can be identified and/or detected by the vehicle 102 for allowing performance of one or more functions such as remote commands via the remote device 104 and recognition of motions or gestures by an operator near or in possession of the remote device 104, among other functions. Components of the vehicle presence indicating system 110, as well as the components of other systems, hardware architectures and software architectures discussed herein, can be combined, omitted or organized into different architectures for various aspects of the disclosure. However, the example aspects and configurations discussed herein focus on the operating environment 100 as illustrated in FIG. 1, with corresponding system components and related methods.

As shown in FIG. 1, a vehicle 102 can detect presence of a remote device 104, and can accordingly generate sound waves 106 as haptic or tactile feedback based on detecting the remote device 104. The feedback can include ultrasound waves that can generate a touch sensation on a user's skin (e.g., arm, hand, face, leg, etc.), and/or can be an indication that the operator is within a range sufficient for issuing remote commands, motions, gestures, etc., for recognition by the vehicle 102 (e.g., for performing responsive action by the vehicle).

In an example, the vehicle 102 can include or can be operably coupled with an electronic control unit (ECU) 112 that operably controls a plurality of vehicle systems. The vehicle systems can include, but are not limited to, the vehicle presence indicating system 110, among others, including vehicle ignition systems, vehicle HVAC systems, vehicle audio systems, vehicle security systems, vehicle video systems, vehicle infotainment systems, vehicle telephone systems, and the like. For example, ECU 112 can control starting/shutting down of an ignition of the vehicle, operation of the HVAC system to circulate air in the vehicle, operation of door locks, windows and an audio system, among other functions, and/or can provide a graphical user or programmatic interface to allow operators or other devices (e.g., processor 120 executing functions described herein) to control such aspects of the vehicle 102.

The vehicle presence indicating system 110 can include or can be operably coupled with one or more sound source arrays 114 for generating sound waves 106. For example, the sound source arrays 114 can be positioned around the vehicle 102 to provide the feedback to approaching vehicle operators, as described herein, at a front, rear, side, etc., of the vehicle. In specific non-limiting examples, the vehicle 102 can include four or five sound source arrays 114 (e.g., one on the front, one on each side, one or two in the rear, etc.). Additionally, the vehicle presence indicating system 110 can include or can be operably coupled with one or more communications devices 116 for detecting or identifying a remote device 104 and/or communicating therewith using an electronic communication technology (such as RFID, NFC, Bluetooth®, ZigBee®, etc.). Moreover, in an example, the vehicle presence indicating system 110 can optionally include or be operably coupled with one or more gesture recognizers 118 for detecting one or more gestures by a vehicle operator, which can include a motion detector for detecting motion in a certain region related to the vehicle 102, a camera for detecting and analyzing gestures sensed in a viewable environment, a feedback processor or sensor for detecting gestures in a sound field generated by sound source array 114, among others.

The vehicle presence indicating system 110 can also include or be operably coupled with (or executed by) one or more processor 120 and one or more memories 122 that communicate to effectuate certain actions at the vehicle 102 (e.g., actions on or associated with ECU 112, sound source array(s) 114, communications device(s) 116, gesture recognizer(s) 118, and/or other components described herein). In one example, one or more of the ECU 112, sound source array(s) 114, communications device(s) 116, gesture recognizer(s) 118, processor(s) 120 and/or memory(ies) 122 can be connected via one or more buses 130.

In addition, it is to be appreciated that the ECU 112 can additionally or alternatively include a processor, memory (e.g., internal processing memory), an interface circuit, and/or buses for transferring data, sending commands, and communicating with the vehicle systems (not shown). In addition, communications device 116, as described, can include substantially any wireless device or related modem for providing wireless computer communications utilizing various protocols to send/receive electronic signals internally to features and systems within the vehicle 102 and/or to external devices. In an example, communications device 116 can communicate according to one or more wireless systems (e.g., RFID, IEEE 802.11, IEEE 802.15.1 (Bluetooth®)), NFC (e.g., ISO 13157), a local area network (LAN), and/or a point-to-point system, etc.).

Figure 2:
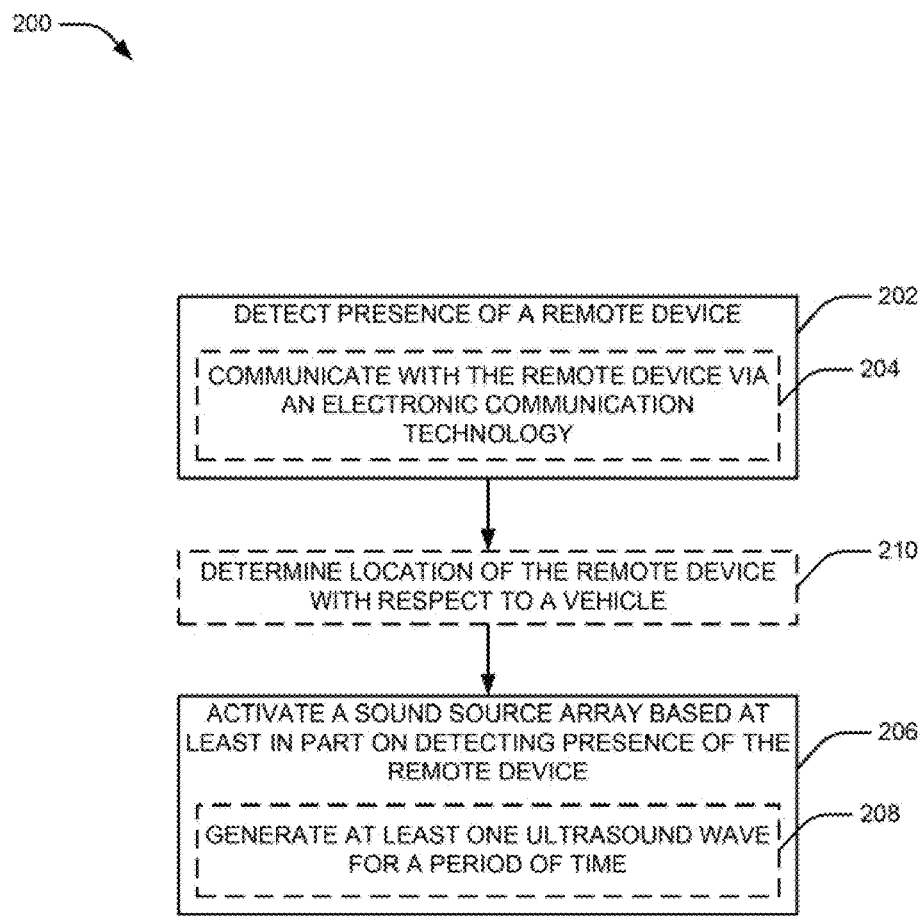
FIG. 2 illustrates a flowchart showing an example method for indicating presence of a vehicle according to one aspect of the disclosure.

Referring now to FIG. 2, an example method 200 that can be utilized by the vehicle presence indicating system 110 is illustrated. In block 202, the method 200 can include detecting presence of a remote device. In an aspect, communications device 116 (e.g., in conjunction with processor 120 and/or memory 122) can detect presence of the remote device (e.g., remote device 104). In one example, detecting presence of the remote device can optionally include, at block 204, communicating with the remote device via an electronic communication technology. For example, communications device 116 can communicate with the remote device 104 via the electronic communication technology, such as RFID, NFC, Bluetooth®, ZigBee®, etc. In an example, communications device 116 can detect the presence of the remote device 104 based at least in part on receiving a request to initiate communications from the remote device 104 or other messages defined by the electronic communication technology that can indicate presence of the remote device 104 (e.g., that the remote device 104 is within a range to communicate with communications device 116 according to the electronic communication technology). For example, such messages can include broadcast signals and handshake messages, among others.

In one specific example, communications device 116 can detect the presence of the remote device 104 as a registered device, such as a key fob, registered mobile device, etc., to allow initiating of commands to the vehicle 102. In this example, ECU 112 can allow operation of one or more vehicle 102 functions based at least in part on communications device 116 detecting the presence of, identifying, and/or being in communication with, remote device 104. For example, ECU 112 can allow interaction with a button to operate a locking mechanism on one or more doors of the vehicle 102, allow starting of an ignition of vehicle 102, allow one or more motions or gestures to effectuate an action on the vehicle 102, among other functions, as described further herein. Moreover, as described, the remote device 104 can be a key fob, mobile device (e.g., cellular phone, tablet, etc.) or any other device that can communicate with communications device 116 using the electronic communication technology. In one example, communications device 116 can detect the presence of the remote device 104 as being within a threshold distance (e.g., within 4 feet), which can include comparing a signal strength of signals from the remote device 104 over the electronic communication technology to one or more thresholds.

In one example, remote device 104 can be paired with the vehicle 102 at the factory where the vehicle 102 is manufactured (e.g., where remote device 104 is a key fob), such that the vehicle 102 stores an identify and/or other secure information related to the remote device 104 (e.g., in memory 122) and can detect/identify the remote device 104 in establishing communications therewith. In another example, ECU 112 can allow for a pairing of the remote device 104 with vehicle 102 (e.g., and/or with one or more components of vehicle 102) to facilitate secure identification of remote device 104. For instance, ECU 112 can store an identifier, security key, and/or other credential information within memory 122 or a memory of ECU 112 to facilitate subsequent identification/presence detection of remote device. 104. Remote device 104 can also receive the credential information, in one example. In any case, remote device 104 can be a key fob that can be paired to the vehicle 102 in this regard or a device personal to a vehicle operator (e.g., a mobile device). In this regard, the remote device 104 can be configured by the vehicle 102 through pairing at the factory or as initiated by the vehicle 102 to facilitate identification and/or detection of the remote device 104.

The communications device 116 can employ other forms of presence detection as well. For example, communications device 116 can be registered to receive global positioning system (GPS) coordinates reported by the remote device 104 (e.g., over one or more networks associated with the vehicle 102 and remote device 104). In this example, communications device 116 can detect the presence (and/or location with respect to vehicle 102) of the remote device 104 based on comparing the GPS coordinates to GPS coordinates associated with the vehicle 102.

At block 206, method 200 can also include activating a sound source array based at least in part on detecting the presence of the remote device. In an aspect, processor 120 can activate the sound source array 114 based on at least in part on communications device 116 detecting presence of the remote device 104. For example, processor 120 can determine that the remote device 104 is within range for communicating with communications device 116 based on communications received at communications device 116 (e.g., which can be reported back to processor 120), and processor 120 can accordingly activate the sound source array 114. As described, each of one or more sound source arrays 114 can include an array (e.g., one or more linear arrays, a matrix, etc.) of sound wave emitters, each operable to emit a sound wave. Thus, activating the sound source array at block 206 can optionally include, at block 208, generating at least one ultrasound wave for a period of time. In an aspect, sound source array 114 can generate the at least one ultrasound wave using the sound wave emitters for the period of time. It is to be appreciated that the sound wave emitters can emit the same sound wave, different sound waves (e.g., different in phase, amplitude, pitch, etc.) to generate a desired sound field.

In an example, processor 120 can cause the sound source array 114 to activate one or more sound wave emitters of the sound source array 114 with ultrasound signals of a certain frequency, amplitude and power, among other characteristics, to provide the desired sound field. The sound field generated by the sound source array 114, which can be an omni-directional sound field, can cause haptic or tactile sensation on a body part of a nearby vehicle operator. In this manner, for example, a notification can be provided to the vehicle operator, who can be in possession of the remote device 104, that the vehicle 102 is nearby (e.g., within range to detect remote commands, gestures, etc., for causing actions on the vehicle 102). In an example, processor 120 can determine a configuration of the sound field based on the location of the remote device 104 with respect to the vehicle (e.g., sound wave emitters nearest the location of the remote device 104 can emit different sound waves to provide a directional sound field toward the remote device 104). In addition, in one example, processor 120 can activate the sound source array 114 for a fixed period of time based on detecting presence of the remote device 104. In another example, processor 120 can activate the sound source array 114 for a period of time defined by continuous detection of the remote device 104 (e.g., while the communications device 116 defects the remote device 104), etc. The period of time can be based on communications device 116 sending keep-alive/polling messages to the remote device 104 (and receiving a valid response), continuing to receive broadcast messages, keep-alive messages, or other communications from the remote device 104, etc.), and/or the like.

In an example, optionally at block 210, method 200 can include determining the location of the remote device with respect to a vehicle. Processor 120 can determine the location of the remote deuce 104 with respect to vehicle 102. For example, processor 120 can determine an approximate location of the remote device 104 based on one or more of multiple antennas associated with communications device 116 that receive communications from the remote device 104, and/or at which communications from the communications device 116 have the strongest signal strength. For example, the antennas and/or independent communications devices 116 can be positioned around the vehicle 102, and the antenna(s) and/or communications device(s) that receive the communications from the remote device 104, receive the strongest signals from remote device 104, etc., can be determined. In an example, processor 120 can determine one or more of a plurality of sound source arrays 114 of the vehicle 102 to activate based on the location of the remote device 104 to provide the haptic or tactile feedback in a reason relevant to location of the remote device 104, and thus the vehicle operator). In another example, as described, where communications device 116 receives GPS coordinates of the remote device 104, processor 120 can determine the location of the remote device 104 respective to the vehicle 102 based on comparing the GPS coordinates with GPC coordinates related to the vehicle 102 location.

Figure 3:
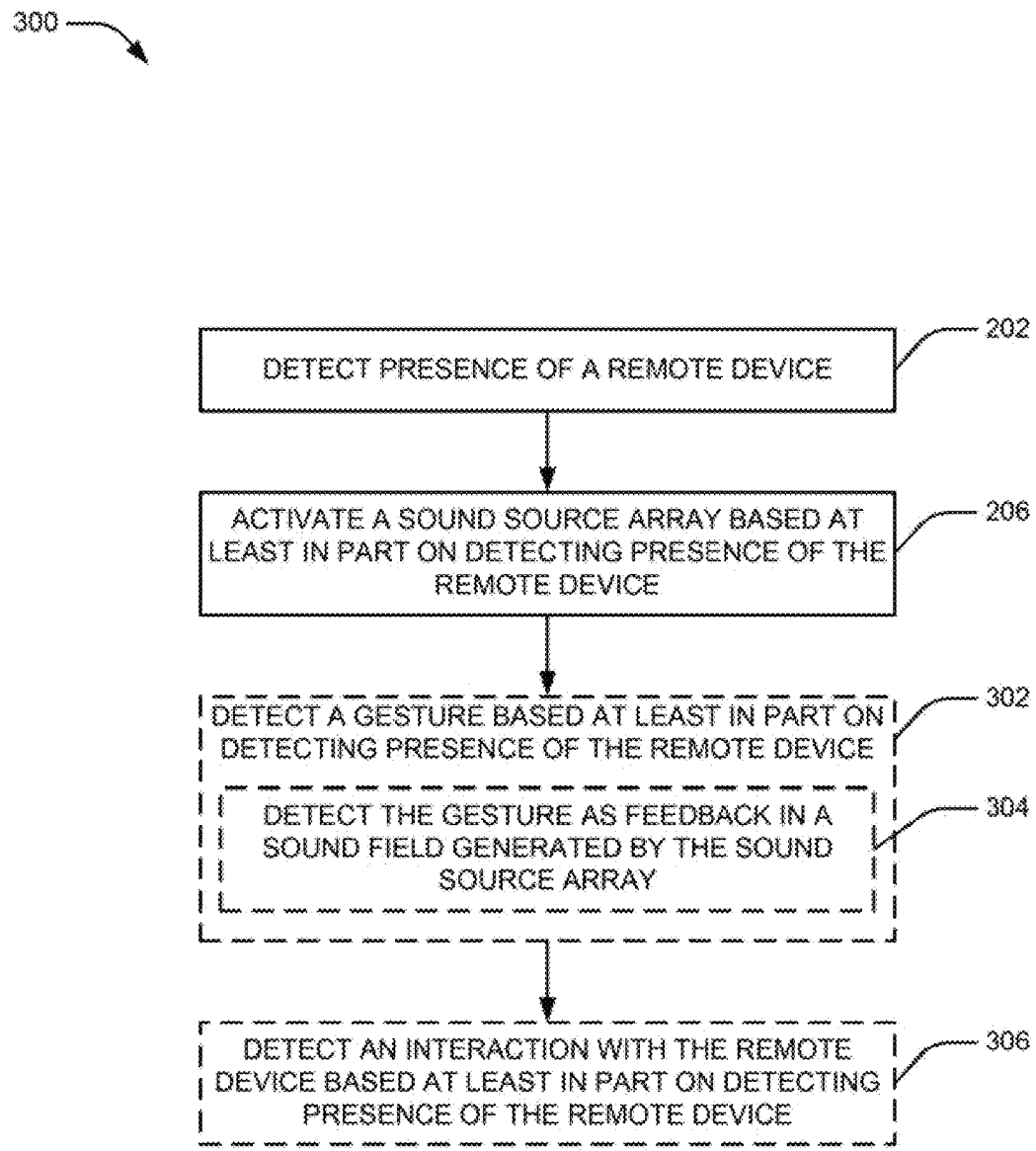
FIG. 3 illustrates a flowchart showing an example method for processing gestures or remote commands based on indicating presence of a vehicle according to one aspect of the disclosure.

Referring now to FIG. 3, an example method 300 that can be utilized by the vehicle presence indicating system 110 is illustrated. In block 202, the method 300 can include detecting presence of a remote device, as described above, which can be carried out by a communications device 116. In block 206, a method 300 can include activating a sound source array based at least in part on detecting presence of the remote device, which can be carried out by a processor 120 that activates the sound source array 114, as described.

In block 302, method 300 can include detecting a gesture based at least in part on detecting the presence of the remote device. In an aspect, gesture recognizer 118 can detect the gesture based at least in part on detecting the presence of the remote device 104. For example, processor 120 can activate (e.g., power on) the gesture recognizer 118 and/or one or more associated components based on detecting presence of the remote device to allow detecting of gestures (e.g., carried out by a vehicle operator) when the remote device 104 is within a certain range of the vehicle (e.g., where the remote device is in possession of the vehicle operator approaching the vehicle 102). In one example, gesture recognizer 118 can include a motion detector positioned on the vehicle 102 to detect motion in a certain area (e.g., under a tailgate) and/or a camera positioned on the vehicle 102 to detect one or more specific gestures of the operator based on recording video thereof, among other gesture recognizers.

In another example, gesture recognizer 118 can include a feedback sensor and/or related processor (e.g., processor 120 or another processors for the sound source array 114 for detecting a gesture performed by the operator within the produced sound field. In this example, detecting the gesture at block 302 can optionally include, at block 304, detecting the gesture as feedback in a sound field generated by the sound source array. For example, gesture recognizer 118 can detect the gesture as feedback in the sound field generated by sound source array 114 (e.g., by sound waves 106). For example, this can include gesture recognizer 118 detecting the reflection of sound waves emitted by the sound source array 114, where the reflection is based on the presence of a body part of the operator or other perturbation in the sound field. Gesture recognizer 118 can accordingly detect movement, and thus gestures, in the sound field based on reflection of the sound waves (e.g., based on a phase, amplitude, direction and/or angle, among other characteristics of the reflected sound waves). Gesture recognizer 118 can provide information regarding a recognized gesture and/or a related vehicle 102 action (e.g., unlock/lock doors, start ignition, open tailgate, etc.) to ECU 112. As described, ECU 112 can effectuate the associated function to one or more vehicle systems of the vehicle 102.

In another example, optionally at block method 306, method 300 can include detecting an interaction with the remote device based at least in part on detecting the presence of the remote device. In an aspect, communications device 116 can detect the interaction with the remote device based at least in part on detecting the presence of the remote device 104. For example, communications device 116 can activate (e.g., power on) or maintain activation of certain communication resources based on detecting the presence of the remote device 104 to receive commands therefrom. As described, communications device 116 can receive commands from remote device 104 related to causing vehicle 102 actions, and communications device 116 can accordingly provide information regarding received commands and or related vehicle action (e.g., unlock/lock doors, start ignition, open tailgate, etc.) to ECU 112.

Aspects of the present disclosure can be implemented using hardware, software, or a combination thereof and can be implemented in one or more computer systems or other processing systems. In one aspect, the disclosure is directed toward one or more compete systems capable of carrying out the functionality described herein. An example of such a computer system 1300 is shown in FIG. 4.

Figure 4:
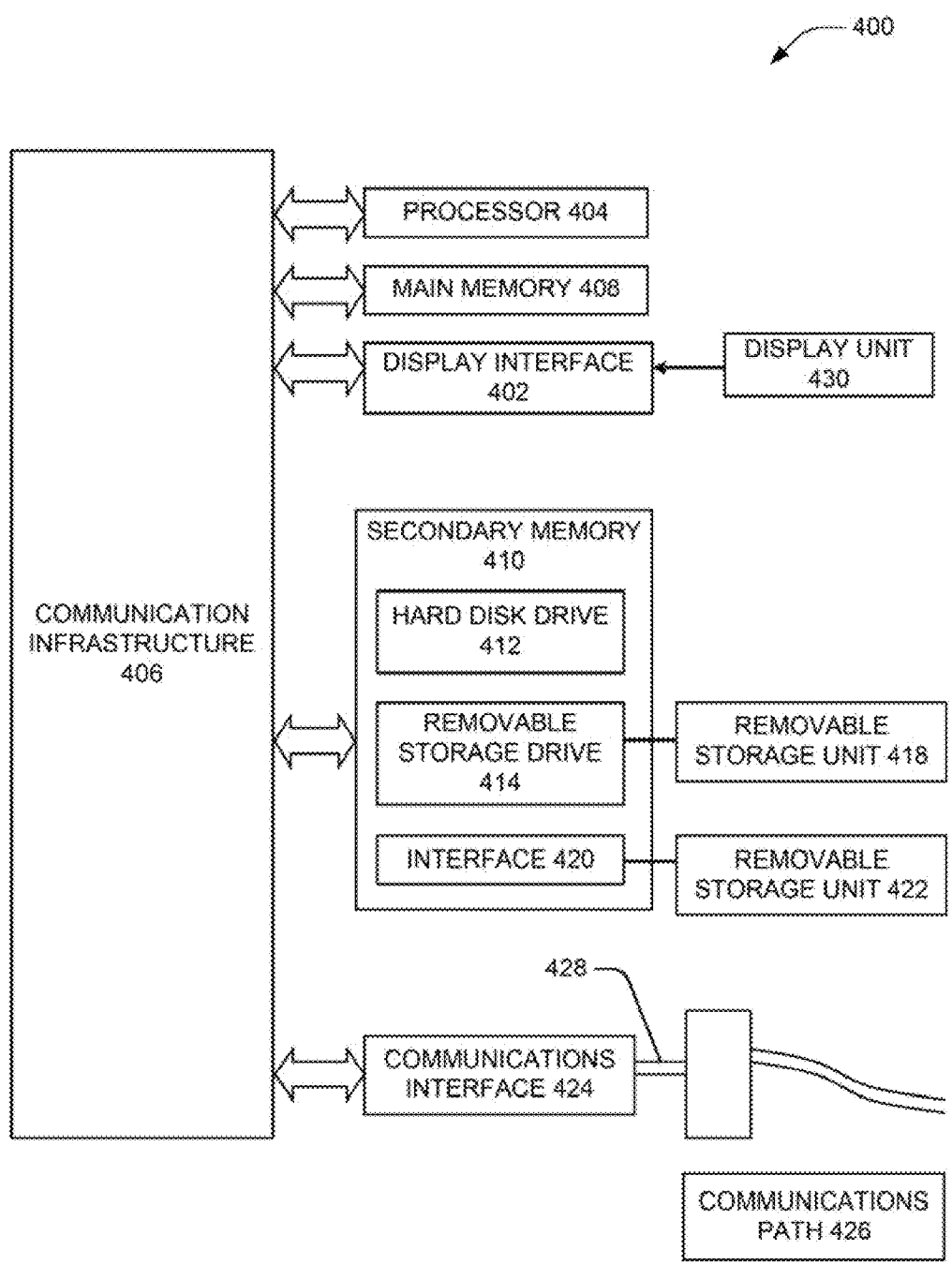
FIG. 4 presents an example system diagram of various hardware components and other features according to one aspect of the disclosure.

FIG. 4 presents an example system diagram of various hardware components and other features, for use in accordance with an aspect of the present disclosure. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). In one example, processor 120 can include processor 404. Various software aspects are described in terms of this example computer system. After reading this description, it will become apparent to a person skilled in the relevant art(s) how to implement aspects described herein using other computer systems and/or architectures.

Computer system 400 can include a display interface 402 that forwards graphics, text, and other data from the communication infrastructure 406 (or from a frame buffer not shown) for display on a display unit 430. Computer system 400 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 can include other similar devices for allowing computer programs or other instructions to be loaded into computer system 400. Such devices can include, for example, a removable storage unit 422 and an interface 420. Examples of such can include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400. In an example, memory 122 can include one or more of main memory 408, secondary memory 410, removable storage drive 414, removable storage unit 418, removable storage unit 422, etc.

Computer system 400 can also include a communication interface 424. Communications interface 424 allows software and data to be transferred between computer system 400 and external devices. Examples of communications interface 424 can include a modem, a network interface (such as an Ethernet card), a communications port, a personal Computer Memory Card International Association (PCMCIA) slot and card, etc. Software and data transferred via communications interface 424 are in the form of signals 428, which can be electronic, electromagnetic, optical or other signals capable of being received by communications interface 424. These signals 428 are provided to communications interface 424 via a communications path (e.g., channel) 426. This path 426 carries signals 428 and can be implemented using wire or cable, fiber optics, a telephone line, a cellular link, a radio frequency (RF) link and or other communications channels. In this document, the terms "computer program medium" and "computer usable medium" are used to refer generally to media such as a removable storage drive 480, a hard disk installed in hard disk drive 470, and signals 428. These computer program products provide software to the computer system 400. Aspects described herein can be directed to such computer program products.

Computer programs (also referred so as computer control logic) are stored in main memory 408 and/or secondary memory 410. Computer programs can also be received via communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400.

In variations where aspects described herein are implemented using software, the software can be stored in a computer program product and loaded into computer system 400 using removable storage drive 414, hard disk drive 412, or communications interface 420. The control logic (software), when executed by the processor 404, causes the processor 404 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 5:
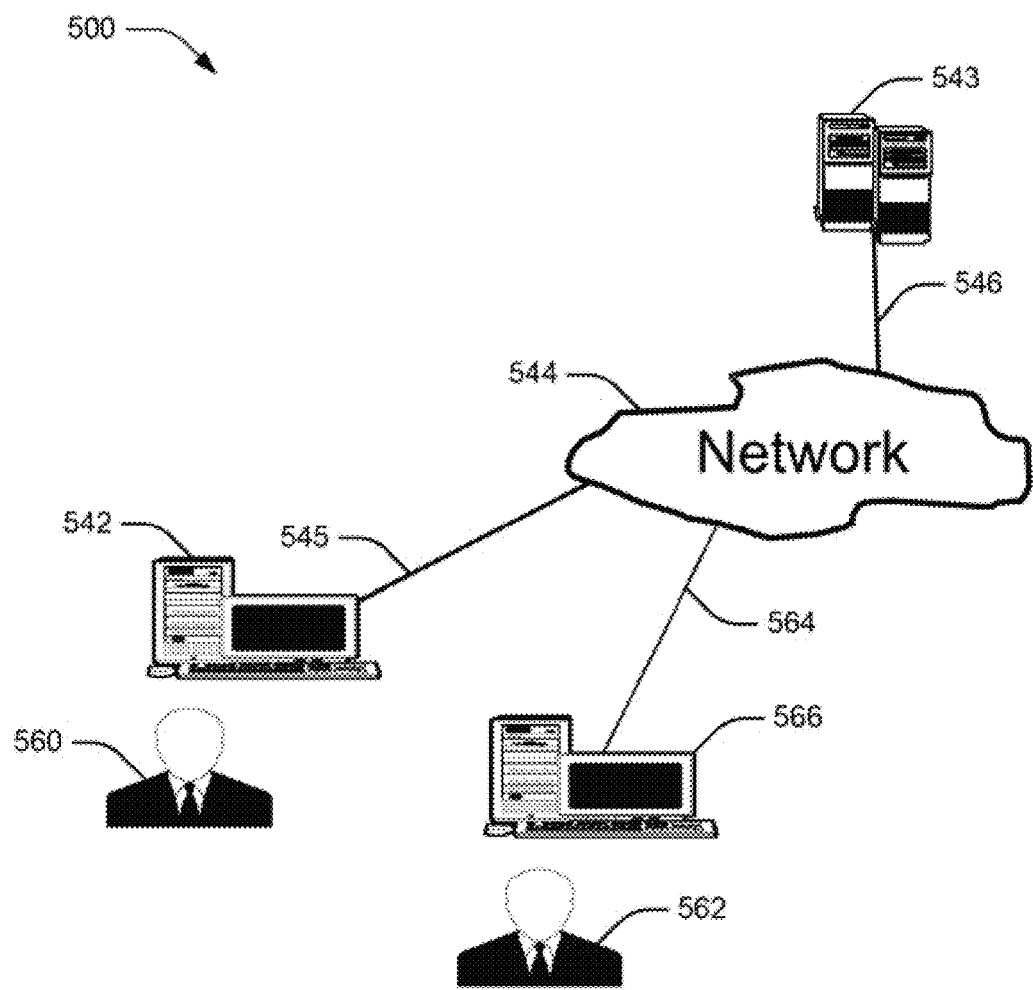
FIG. 5 is a block diagram of various example system components according to one aspect of the disclosure.

FIG. 5 is a block diagram of various example system components, in accordance with an aspect. FIG. 5 shows a communication system 500 usable in accordance with aspects described herein. The communication system 500 includes one or more accessors 560, 562 (also referred to interchangeably herein as one or more "users") and one or more terminals 542, 566. For example, terminals 542, 566 can include vehicle 102 or a related system (e.g., vehicle presence indicating system 110, processor 120, communications device 116, etc.), remote device 104, and/or the like. In one aspect, data for use in accordance with aspects described herein is, for example, input and/or accessed by accessors 560, 562 via terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, for example, a network 544, such as the Internet or an intranet, and couplings 545, 546, 564. The couplings 545, 546, 1464 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method of indicating vehicle presence, comprising:
   detecting, by a vehicle, a presence of a remote device within a range of the vehicle sufficient for the vehicle to recognize commands issued to the vehicle; and
   activating, by the vehicle, a sound source array positioned on the vehicle for generating one or more ultrasound waves to provide haptic feedback to a vehicle operator approaching the vehicle, wherein the activating, by the vehicle, the sound source array is based at least in part on the detecting, by the vehicle, the presence of the remote device, and wherein the activating, by the vehicle, the sound source array comprises activating the sound source array at a frequency, amplitude, or power to provide a sound field for the haptic feedback in a region relevant to a location of the remote device.

2. The method of claim 1, wherein activating the sound source array comprises:
   generating the one or more ultrasound waves for a period of time based on detecting the presence of the remote device.

3. The method of claim 1, wherein activating the sound source array comprises:
   generating the one or more ultrasound waves for a period of time while the presence of the remote device is detected.

4. The method of claim 1, further comprising:
   determining a location of the remote device with respect to the vehicle, wherein activating the sound source array comprises activating one or more of a plurality of sound source arrays based at least in part on the location with respect to the vehicle.

5. The method of claim 1, further comprising:
   detecting a gesture based at least in part on detecting the presence of the remote device; and
   processing the gesture to generate an action on the vehicle.

6. The method of claim 5, wherein detecting the gesture comprises:
   detecting a gesture as feedback in a sound field generated by the sound source array.

7. The method of claim 1, further comprising:
   detecting an interaction with the remote device based at least in part on detecting the presence of the remote device; and
   processing the interaction to generate an action on the vehicle.

8. The method of claim 1, wherein detecting the presence of the remote device is based at least in part on detecting communication with the remote device using an electronic communication technology.

9. The method of claim 8, wherein the electronic communication technology comprises radio frequency identification (RFID), near field communication (NFC), Bluetooth, or ZigBee.

10. The method of claim 1, wherein activating, by the vehicle, the sound source array comprises activating one or more of a plurality of sound wave emitters of the sound source array based on a location of the remote device and based on emitter location of the plurality of sound wave emitters around the vehicle.

11. A system for indicating vehicle presence, comprising:
    a vehicle;
    an electronic control unit coupled to the vehicle for communicating with one or more vehicle systems of the vehicle;
    a communications device coupled to the vehicle and configured to detect a presence of a remote device within a range of the vehicle sufficient for the vehicle to recognize commands issued to the vehicle;
    a sound source array positioned on and coupled to the vehicle and configured to generate one or more ultrasound waves to provide haptic feedback; and
    at least one processor configured to activate the sound source array to provide haptic feedback to a vehicle operator approaching the vehicle, wherein the at least one processor is configured to activate the sound source array based at least in part on the communications device detecting the presence of the remote device, and wherein the at least one processor is configured to activate the sound source array at a frequency, amplitude, or power to provide a sound field for the haptic feedback in a region relevant to a location of the remote device.

12. The system of claim 11, wherein the at least one processor is configured to activate for a period of time based on the communications device detecting the presence of the remote device.

13. The system of claim 11, wherein the at least one processor is configured to activate the sound source array for a period of time while the communications device detects the presence of the remote device.

14. The system of claim 11, wherein the at least one processor is further configured to determine a location of the remote device with respect to the vehicle, wherein the at least one processor is configured to activate the sound source array by activating one or more of a plurality of sound source arrays based at least in part on the location with respect to the vehicle.

15. The system of claim 11, further comprising:
a gesture recognizer configured to:
 detect a gesture based at least in part on the communications device detecting the presence of the remote device; and
 process the gesture to generate an action on one or more of the one or more vehicle systems via the electronic control unit.

16. The system of claim 15, wherein the gesture recognizer is configured to detect the gesture as feedback in a sound field generated by the sound source array.

17. The system of claim 11, wherein the communications device is further configured to:
 detect an interaction with the remote device based at least in part on detecting the presence of the remote device; and
 process the interaction to generate an action on one or more of the one or more vehicle systems via the electronic control unit.

18. The system of claim 11, wherein the communications device is configured to detect the presence of the remote device using an electronic communication technology.

19. The system of claim 18, wherein the at least one processor is configured to activate the sound source array at least in part by activating one or more of a plurality of sound wave emitters of the sound source array based on a location of the remote device and based on emitter location of the plurality of sound wave emitters around the vehicle.

20. A non-transitory computer-readable medium storing computer executable code for indicating vehicle presence, comprising code for:
 detecting, by a vehicle, a presence of a remote device within a range of the vehicle sufficient for the vehicle to recognize commands issued to the vehicle; and
 activating a sound source array positioned on the vehicle for generating one or more ultrasound waves to provide haptic feedback to a vehicle operator approaching the vehicle, wherein the activating the sound source array is based at least in part on the detecting, by the vehicle, the presence of the remote device, and wherein the activating the sound source array comprises activating the sound source array at a frequency, amplitude, or power to provide a sound field for the haptic feedback in a region relevant to a location of the remote device.

* * * * *